(12) United States Patent
Armbruster

(10) Patent No.: US 8,789,871 B2
(45) Date of Patent: Jul. 29, 2014

(54) CONVERTIBLE WITH A ROOF ARRANGEMENT

(75) Inventor: Reiner Armbruster, Muehlacker (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 151 days.

(21) Appl. No.: 13/300,848

(22) Filed: Nov. 21, 2011

(65) Prior Publication Data

US 2012/0193937 A1 Aug. 2, 2012

(30) Foreign Application Priority Data

Feb. 1, 2011 (DE) .......................... 10 2011 000 435

(51) Int. Cl.
*B60J 7/12* (2006.01)

(52) U.S. Cl.
USPC .................................................... 296/107.08

(58) Field of Classification Search
USPC ............. 296/107.08, 107.01, 107.16, 107.19, 296/108; 428/31; D12/403
See application file for complete search history.

(56) References Cited

U.S. PATENT DOCUMENTS

| | | | | |
|---|---|---|---|---|
| 3,347,592 A * | 10/1967 | Renneker | .................... | 296/107.2 |
| 4,775,436 A * | 10/1988 | Eash | ............... | 156/219 |
| 5,429,409 A * | 7/1995 | Corder et al. | ................. | 296/108 |
| 5,491,021 A * | 2/1996 | Tolliver et al. | ................ | 428/217 |
| 5,533,777 A * | 7/1996 | Kleemann et al. | ............ | 296/117 |
| 6,024,403 A * | 2/2000 | Ritter et al. | ..................... | 296/117 |
| 6,033,008 A * | 3/2000 | Mattila | .................... | 296/107.17 |
| 6,547,312 B2 * | 4/2003 | Winkler | .................... | 296/100.14 |
| 6,572,175 B2 * | 6/2003 | Schutt et al. | ................... | 296/108 |
| 6,767,044 B2 * | 7/2004 | Tohda et al. | ............. | 296/107.01 |
| 6,866,326 B2 * | 3/2005 | Hoppermann | ................ | 296/108 |
| 6,871,898 B2 * | 3/2005 | Jarrard et al. | ............ | 296/107.01 |
| 7,014,245 B2 * | 3/2006 | Yoshida et al. | .......... | 296/107.01 |
| 7,014,247 B2 * | 3/2006 | Dilluvio | .................... | 296/107.17 |
| 7,213,866 B2 * | 5/2007 | Metts et al. | ..................... | 296/102 |
| 7,226,109 B2 * | 6/2007 | Martin | ..................... | 296/107.08 |
| 7,455,347 B2 * | 11/2008 | Heselhaus et al. | ........ | 296/107.17 |
| 7,571,951 B2 | 8/2009 | Kreiling et al. | | |
| 7,708,333 B2 * | 5/2010 | Kracht | .......................... | 296/108 |
| 8,132,841 B2 * | 3/2012 | Steuernagel et al. | .... | 296/107.01 |

(Continued)

FOREIGN PATENT DOCUMENTS

| | | |
|---|---|---|
| DE | 102006038057 A1 | 2/2008 |
| DE | 102006052341 A1 | 5/2008 |

(Continued)

OTHER PUBLICATIONS

British Combined Search and Examination Report of May 23, 2012, relating to British Patent Application No. GB1201324.9.

*Primary Examiner* — Glenn Dayoan
*Assistant Examiner* — Paul Chenevert
(74) *Attorney, Agent, or Firm* — RatnerPrestia

(57) ABSTRACT

A convertible with a roof arrangement can be displaced between a closed position and an open position. The roof arrangement is accommodated in a storage compartment, and which has a roof outer skin (convertible-top cloth) with a graphical element on the external visible side. A visually attractive roof arrangement is distinguished in that the graphical element is arranged on the external visible side in such a manner that it is completely visible from the outside of the vehicle both in the closed position and in the open position, and the storage compartment is configured to be completely open or partially open upward.

6 Claims, 3 Drawing Sheets

(56) References Cited

U.S. PATENT DOCUMENTS

| | | | |
|---|---|---|---|
| 8,172,303 B2 * | 5/2012 | Odoi et al. | 296/107.08 |
| 2003/0160475 A1 * | 8/2003 | Tohda et al. | 296/124 |
| 2006/0261630 A1 * | 11/2006 | Fleming et al. | 296/107.08 |
| 2007/0090664 A1 * | 4/2007 | Wezyk | 296/107.17 |
| 2007/0158971 A1 * | 7/2007 | Kreiling | 296/107.01 |
| 2008/0265610 A1 * | 10/2008 | Condon et al. | 296/107.08 |
| 2008/0265611 A1 * | 10/2008 | Flynn | 296/108 |
| 2010/0301628 A1 * | 12/2010 | Fallis et al. | 296/107.08 |
| 2011/0226312 A1 * | 9/2011 | Bohm et al. | 136/251 |
| 2011/0260494 A1 * | 10/2011 | Kudrashova | 296/107.09 |

FOREIGN PATENT DOCUMENTS

| | | | |
|---|---|---|---|
| DE | 102008057945 A1 | 5/2009 | |
| DE | 10 2008 044 940 A1 | 3/2010 | |
| EP | 1769959 A1 | 4/2007 | |
| JP | 62198517 A * | 9/1987 | B60J 7/08 |

* cited by examiner

CONVERTIBLE WITH A ROOF ARRANGEMENT

CROSS-REFERENCE TO RELATED APPLICATION

This application claims the priority, under 35 U.S.C. §119, of German application DE 10 2011 000 435.1, filed Feb. 1, 2011; the prior application is herewith incorporated by reference in its entirety.

BACKGROUND OF THE INVENTION

Field of the Invention

The invention is based on a convertible with a roof arrangement.

A convertible top of this type is known from published, non-prosecuted German patent application DE 10 2008 044 940 A1. As is customary in convertibles, the roof arrangement is movable between a closed position and an open position, the roof arrangement in the open position being stored in a storage compartment. The roof arrangement has a roof outer skin, here a flexible convertible-top cover on which a separate graphical element is fixed by a fastening device. The graphical element is referred to as an information carrier and is arranged on the external visible side of the roof outer skin in the region of the C pillar.

SUMMARY OF THE INVENTION

It is accordingly an object of the invention to provide a convertible with a roof arrangement which overcomes the above-mentioned disadvantages of the prior art devices of this general type, in which the appearance of the roof arrangement of a convertible is optimized.

With the foregoing and other objects in view there is provided, in accordance with the invention a convertible. The convertible contains a storage compartment configured to be at least partially open in an upward direction; and a roof configuration displaced between a closed position and an open position. The roof configuration is accommodated in the storage compartment. The roof configuration contains a roof outer skin having an external visible side with a graphical element on the external visible side, the graphical element is disposed on the external visible side such that the graphical element is completely visible from an outside of the convertible both in the closed position and in the open position. The graphical element is a form of indicia such as a company logo or a vehicle model brand image.

The advantages primarily obtained with the invention can be seen in the fact that the graphical element is visible irrespective of the final position of the roof arrangement, i.e. irrespective of whether the roof arrangement is in the closed position or in the open position. In particular in the case of roof arrangements which can be put away folded in a "Z"-shaped manner, a section of the roof outer skin in the open position forms, as it were, a lid of the storage compartment, which is also referred to as the convertible-top compartment. During the putting-away movement between the closed position and the open position, the section of the roof outer skin maintains its orientation, i.e. the external visible side of the roof outer skin is visible from above both in the closed position and in the open position. According to the invention, provision is furthermore made for the storage compartment for the roof arrangement not to be closed by a convertible-top compartment lid. As an alternative, it is possible to provide a convertible-top compartment lid which only partially upwardly covers the storage compartment, specifically in such a manner that the graphical element remains visible even in the open position of the roof arrangement. The convertible-top compartment lid—if present—is fitted either fixedly or movably on the convertible.

An exemplary embodiment is particularly preferred, in which the roof arrangement has a front, dimensionally stable, plate-like roof segment which is covered by the roof outer skin, wherein the graphical element is arranged exclusively in the region of the roof segment. It follows, in particular in conjunction with the abovementioned folding in a Z-shaped manner that the plate-like roof segment upwardly closes the storage compartment, but the graphical element remains visible. In addition, the plate-like roof segment supports the roof outer skin, and therefore the graphical element is not folded up and thus imparts a high-quality visual impression.

Furthermore, it is preferred that the roof arrangement has lateral roof frames, wherein a graphical element is assigned adjacent either to both or just one roof frame, and in particular the graphical element is arranged parallel to the profile of the lateral roof frame. For this purpose, provision can additionally be made for the lateral roof frame or roof frames to have a curved profile. The profile or the extent of the graphical element would accordingly be parallel to the lateral roof frame.

An exemplary embodiment is particularly preferred in which the roof outer skin is a flexible convertible-top cloth, wherein the graphical element is impressed into the convertible-top cloth in a manner permanently deforming the latter. In comparison to the prior art, this results in the graphical element having greater durability and security against being lost, and therefore the element cannot be detached from the convertible-top cloth.

In a development of the invention, provision is made here for the convertible-top cloth to be at least partially produced from a plastic, and in particular to be configured as a woven fabric in which at least individual threads or all of the warp and/or weft threads consist of or contain plastic. However, a film-like convertible-top cloth made of plastic would also be conceivable. The graphical element can be impressed into convertible-top cloths of this type in a particularly cost-effective and simple manner. However, other alternatives for the roof outer skin, for example dimensionally stable sheet-metal and/or plastics coverings, as used for folding roofs (RHT), are also conceivable.

An exemplary embodiment is particularly preferred in which the storage compartment is partially closed by a convertible-top compartment lid, wherein, in the storage position of the roof arrangement, the convertible-top compartment lid does not cover the graphical element, or leaves the latter free.

Other features which are considered as characteristic for the invention are set forth in the appended claims.

Although the invention is illustrated and described herein as embodied in a convertible with a roof arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
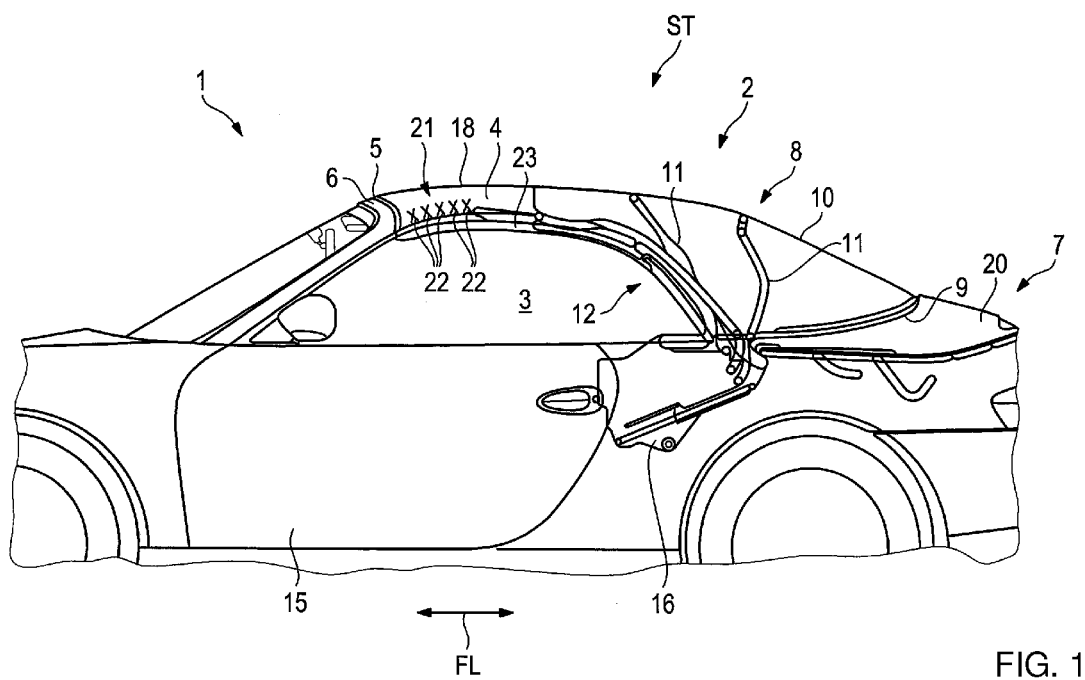
FIG. 1 is a diagrammatic, side view of a convertible with a roof arrangement in the closed position according to the invention.
Figure 2:
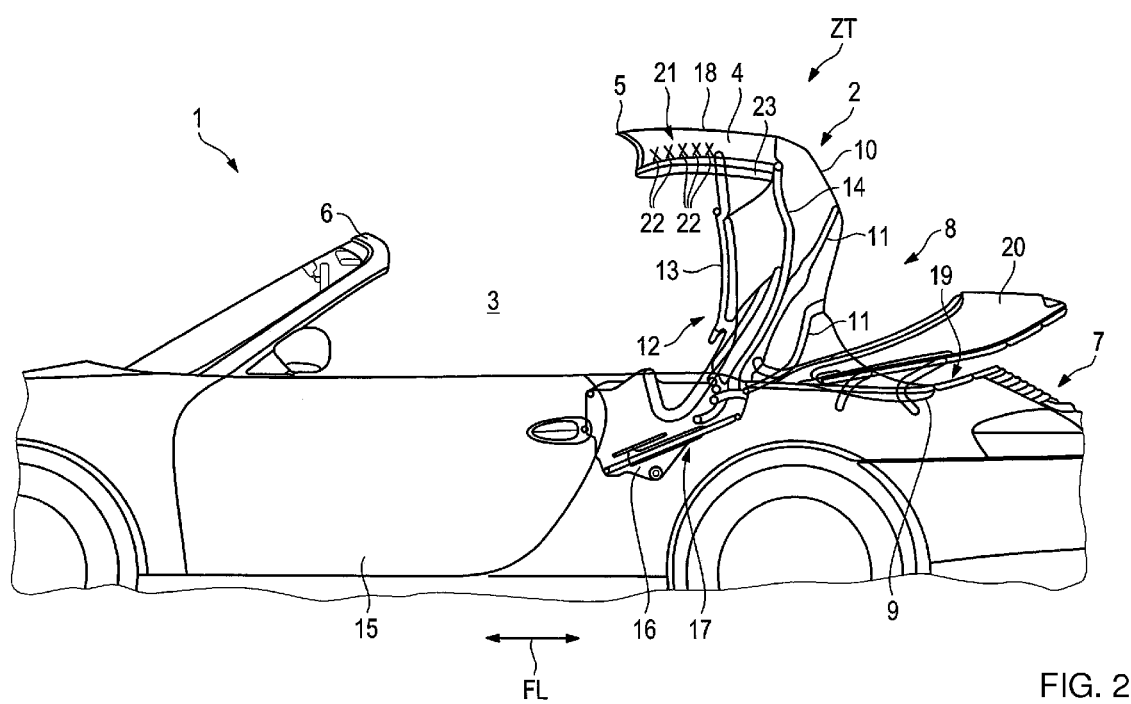
FIG. 2 is a side view of the convertible with the roof arrangement in an intermediate position.

Referring now to the figures of the drawing in detail and first, particularly, to FIG. 1 thereof, there is shown in a side view, part of a convertible 1, i.e. an open passenger vehicle, which is equipped with a roof arrangement 2 which can be put away and, in a closed position ST, covers a passenger compartment 3 located therebelow. The roof arrangement 2 has a front, dimensionally stable and plate-like roof segment 4 which, in the closed position ST, is releasably connected by a front roof tip 5 thereof to an upper cowl 6 of a body 15 by a non-illustrated convertible-top fastener. The front roof segment 4 is adjoined in the direction of a vehicle rear 7 by a rear section 8 of the roof arrangement 2. The rear section 8 reaches as far as a rear end of the roof arrangement, wherein the end is formed by a tensioning bow 9 (merely indicated here). A flexible convertible-top cloth 10 of the roof arrangement 2 extends between the tensioning bow 9 and the roof tip 5, wherein the convertible-top cloth 10 is supported in the front section of the roof arrangement 2 by the plate-like roof segment 4 while it is held or supported in the rear section 8 clamped merely in lines by one or more "bows" 11 when the roof arrangement 2 takes up the closed position ST. The bows 11 are part of a convertible-top linkage 12 which is illustrated in more detail in FIG. 2. The convertible-top linkage 12 has a front and rear link 13, 14 which are held movably on a convertible-top bearing 16 fastened to the body 15, and therefore the roof arrangement 2 can be brought from the closed position ST according to FIG. 1 passing through an intermediate position ZT (see FIG. 2) into an open or storage position AT (see FIG. 3), in which the roof arrangement 2 upwardly opens up the passenger compartment 3. The convertible-top linkage 12 is preferably coupled to a convertible-top drive 17 which can move the roof arrangement 2 between the closed position ST and the storage position AT, and vice versa.

The front and rear links 13 and 14 are connected at the end thereof which faces away from the convertible-top bearing 16 to the roof segment 4 such that, together with the roof segment 4, the links form a four-bar linkage. It is therefore possible, as a comparison of FIGS. 1 to 3 with each other shows, to be able to put away the roof segment 4 with the external visible side 18 thereof retaining the spatial orientation thereof, i.e. the external visible side 18 points upward both in the closed position ST and in the open or storage position AT, as a comparison of FIGS. 1 and 3 reveals.

Figure 3:
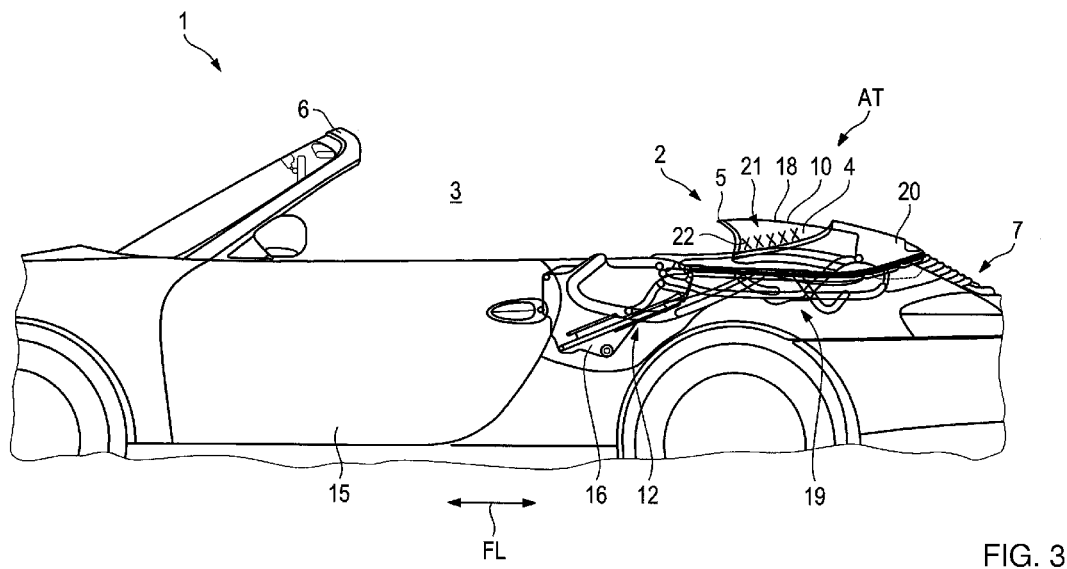
FIG. 3 is a side view of the convertible with the roof arrangement in an open position.

In the storage position AT, the roof arrangement 2 is stashed or arranged in a storage compartment 19 in the vicinity of the vehicle rear 7, wherein preferably a "half" convertible-top compartment lid 20 only partially closes the storage compartment 19 both in the closed position ST of the roof arrangement 2 and in the storage position AT thereof, as revealed in particular in FIGS. 1 and 3. The external visible side 18 of the roof segment 4 therefore remains visible even from the outside of the vehicle when the roof arrangement 2 takes up the storage position AT.

A graphical element 21 which can have one or more characters 22 is arranged on the external visible side 18 on the convertible-top cover 10 in the region of the front roof segment 4. The profile or the extent of the graphical element 21, which is configured here in the shape of a strip, is approximately parallel to a lateral roof frame 23 of the roof arrangement 2, wherein the lateral roof frame 23 can in particular have a curved profile, as shown in FIG. 1. The graphical element 21 is particularly preferably handwriting with a plurality of characters 22, the handwriting extending parallel to the roof frame 23. Of course, lateral roof frames 23 of this type can be provided on both sides of the vehicle. A graphical element 21 can correspondingly also be provided on each side of the vehicle.

In a preferred embodiment, the graphical element 21 is impressed directly into the flexible convertible-top cloth 10 in a manner permanently deforming the latter and can thus form a depression on a visible side 18 of the convertible-top cloth 10. In this case, the length of the graphical element, as measured in the longitudinal direction of the vehicle, is dimensioned in such a manner that the graphical element is completely visible from the outside of the vehicle even in the storage position AT of the roof arrangement 2, i.e. is not covered by the convertible-top compartment lid 20.

As an alternative to the provision parallel to the lateral roof frame 23, according to an exemplary embodiment which is not shown here the graphical element 21 could also be provided parallel to the roof tip 5, i.e. parallel to the upper cowl 6 on the external visible side 18 of the convertible-top cloth 10. It would also be possible, according to an exemplary embodiment not illustrated here, also to provide the graphical element 21 approximately centrally on the convertible-top cloth 10 in the region of the roof segment 4. Looking at FIG. 3, it is obvious that one or more graphical elements 21 can be provided in the region of the roof segment 4 in such a manner that the convertible-top compartment lid 20 leaves the graphical element or graphical elements 21 free and does not cover the element or elements, if a convertible-top compartment lid is provided.

The handwriting with a plurality of characters 22 may be, for example, a vehicle model name, a manufacturer's name or an addition to a model name. Instead of characters 22, symbols, emblems, escutcheons, numbers or the like may also be provided. Of course, combinations thereof are also possible.

The invention claimed is:

1. A convertible, comprising:
   a storage compartment configured to be at least partially open in an upward direction; and
   a roof configuration displaced between a closed position and an open position, said roof configuration accommodated in said storage compartment, said roof configuration containing a roof outer skin having an external visible side with a graphical element on said external visible side, the graphical element disposed on said external visible side such that the graphical element is completely visible from an outside of the convertible both in the closed position and in the open position,
   wherein said roof configuration had a front, dimensionally stable, plate-shaped roof segment covered by said roof outer skin, and the graphical element is disposed exclusively in a region of said front, dimensionally stable, plate-shaped roof segment.

2. The convertible according to claim 1, wherein said roof configuration has lateral roof frames, and the graphical element is disposed parallel to said lateral roof frames.

3. The convertible according to claim 1, wherein said roof configuration can be put away folded in a "Z"-shaped manner.

4. The convertible according to claim 1, further comprising a convertible-top compartment lid, said storage compartment is partially closed by said convertible-top compartment lid which, in the closed position of said roof configuration, leaves the graphical element free.

5. The convertible according to claim 1, wherein said roof outer skin is a flexible convertible-top cloth, and in that the graphical element is impressed into said flexible convertible-top cloth in a manner permanently deforming said flexible convertible-top cloth.

6. The convertible according to claim 5, wherein said flexible convertible-top cloth is at least partially produced from a plastic.

\* \* \* \* \*